(12) United States Patent
Pardoen (10) Patent No.: US 9,501,443 B2
(45) Date of Patent: Nov. 22, 2016

(54) DIFFERENTIAL LINE DRIVER CIRCUIT AND METHOD THEREFOR

(75) Inventor: Matthijs Pardoen, Pompertuzat (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/403,607

(22) PCT Filed: Jun. 27, 2012

(86) PCT No.: PCT/IB2012/001960
§ 371 (c)(1),
(2), (4) Date: Nov. 25, 2014

(87) PCT Pub. No.: WO2014/001838
PCT Pub. Date: Jan. 3, 2014

(65) Prior Publication Data
US 2015/0145563 A1    May 28, 2015

(51) Int. Cl.
*H03B 1/00* (2006.01)
*H03K 3/00* (2006.01)
*G06F 13/40* (2006.01)

(52) U.S. Cl.
CPC ................. *G06F 13/4072* (2013.01)

(58) Field of Classification Search
CPC ............. H03K 19/00361; H03K 19/00315; H03K 17/063; H04L 25/0278; H04L 25/0269
USPC ................. 327/108–112; 326/30–34
See application file for complete search history.

(56) References Cited

U.S. PATENT DOCUMENTS

| | | | |
|---|---|---|---|
| 4,862,275 A * | 8/1989 | Meisenzahl | H04N 3/1525 348/322 |
| 5,739,707 A * | 4/1998 | Barraclough | H04L 25/03834 326/27 |
| 7,535,258 B1 * | 5/2009 | Johnson | H03F 3/45237 326/68 |
| 7,595,674 B1 | 9/2009 | Cetin et al. | |
| 7,944,259 B2 * | 5/2011 | Senda | G09G 3/2096 327/149 |
| 8,395,411 B2 * | 3/2013 | Diffenderfer | H03K 5/04 326/30 |

(Continued)

FOREIGN PATENT DOCUMENTS

EP    0955750 A2    11/1999

OTHER PUBLICATIONS

International Search Report and Written Opinion correlating to PCT/IB2012/001960 dated Mar. 19, 2013.

*Primary Examiner* — Lincoln Donovan
*Assistant Examiner* — Diana J Cheng (57) ABSTRACT

A differential line driver circuit comprising a plurality of driver stages is described. Each driver stage is operably coupled to at least one output of the line driver circuit and arranged to receive at least one control signal and to drive at least one output signal on the at least one output of the line driver circuit in accordance with the at least one control signal received thereby. The line driver circuit further comprises at least one delay component arranged to receive the at least one control signal, and to sequentially propagate the at least one control signal to the driver stages with time delays between the propagation of the at least one control signal to sequentially adjacent driver stages. The delay component is arranged to sequentially propagate the at least one control signal to the driver stages such that such that the at least one control signal is propagated with at least one of: a progressively increasing time delay between sequentially adjacent driver stages; and a progressively decreasing time delay between sequentially adjacent driver stages.

14 Claims, 4 Drawing Sheets

(56) References Cited

U.S. PATENT DOCUMENTS

2010/0052758 A1 3/2010 Quan et al.

2012/0086470 A1* 4/2012 Diffenderfer ............ H03K 5/04
    326/30

* cited by examiner

DIFFERENTIAL LINE DRIVER CIRCUIT AND METHOD THEREFOR

FIELD OF THE INVENTION

The field of this invention relates to a differential line driver circuit and a method of driving an output signal for transmission over at least one communication line.

BACKGROUND OF THE INVENTION

Differential line drivers, such as those used within Controller Area Network (CAN) devices, typically drive unshielded twisted pair (UTP) transmission lines, which connect Electronic Control Units (ECUs) and the like to, for example, modules containing sensors or other ECUs. One requirement of such differential line drivers used within automotive applications is that they generate a low level of electromagnetic emission (EME).

In order to achieve a differential signal driver capable of generating the required low EME, one needs to make the generated signals as differential as possible. In addition, one needs to minimize power supply noise, and in particular on chip digital power supply noise, which is coupled through the final switch's gate drain capacitance to the output. One way to achieve this is using common mode feedback circuits. However, such closed-loop feedback circuits are significantly disturbed during EME (or electromagnetic interference (EMI)) events. To avoid such issues using common mode feedback, it is known to implement an open-loop driver cell with high side and low side switches, in which multiple parallel driver cells are switched 'on' and 'off' after small delays. Such a multiple parallel driver cell implementation provides a quiet common mode voltage level and therefore low EME.

A further requirement of such differential line drivers used within automotive applications is to reduce differential ringing on the transmission lines, which is a direct result of non-optimal terminated network transmission lines. When ringing is excessive, the receiver will be triggered after some ring periods giving rise to significant delay. This requirement has lead to a demand for lowering the maximum signal derivative (max|d(VCANH−CANL)/dt|) thereby providing linear rising and falling slopes.

Multiple parallel driver cells in an open-loop arrangement, using the same parallel driver cells and equal delays, results in a 'current thermometer' Digital to Analogue Converter (DAC). However, such a DAC requires a virtual grounded output voltage in order to linearise the rising and falling slopes, which is not supported by this driver as the driver's output is not grounded.

One can stagger non equal cells using a weighting algorithm, such as disclosed in IEC 62228, Ed. 1.0, Integrated circuits—EMC evaluation of CAN transceivers, 2007, to achieve linear rise and fall shapes. However, this approach requires lookup tables, state machines and/or different cell designs, making impedance matching and design difficult.

SUMMARY OF THE INVENTION

The present invention provides a line driver circuit and a method of driving an output signal for transmission over at least one communication line as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

An example of an embodiment of a multi-stage line driver circuit will now be described with reference to a Controller Area Network (CAN) driver. However it will be apparent that the present invention is not limited to a CAN driver, and may equally be implemented within drivers for alternative network systems in which it is necessary or desirable to control the rise and fall of an output signal, for example to minimise ringing, etc.

Furthermore, because the illustrated embodiments of the present invention may for the most part, be implemented using electronic components and circuits known to those skilled in the art, details will not be explained in any greater extent than that considered necessary, as illustrated below, for the understanding and appreciation of the underlying concepts of the present invention and in order not to obfuscate or distract from the teachings of the present invention.

Figure 1:
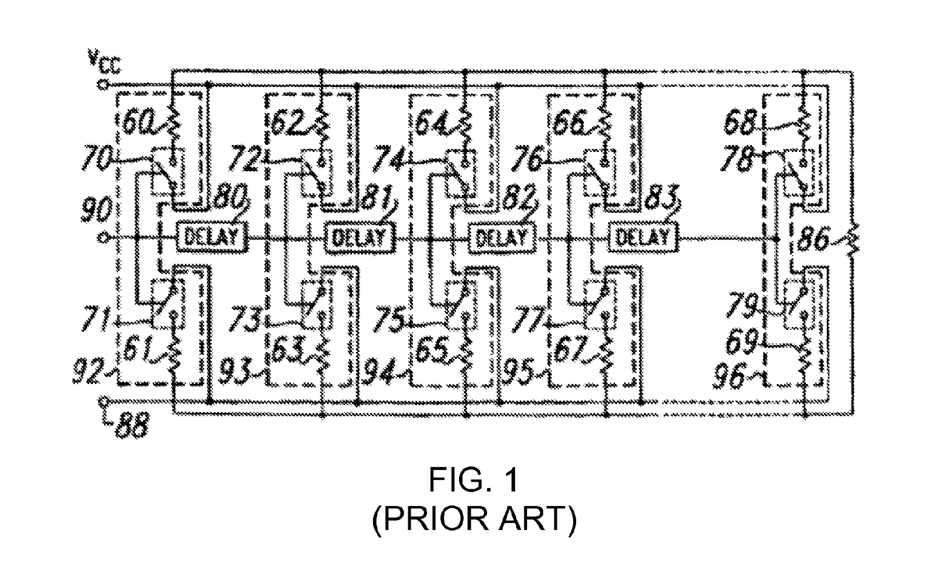
FIG. 1 illustrates a schematic circuit diagram of a known multi-stage driver circuit.
Figure 2:
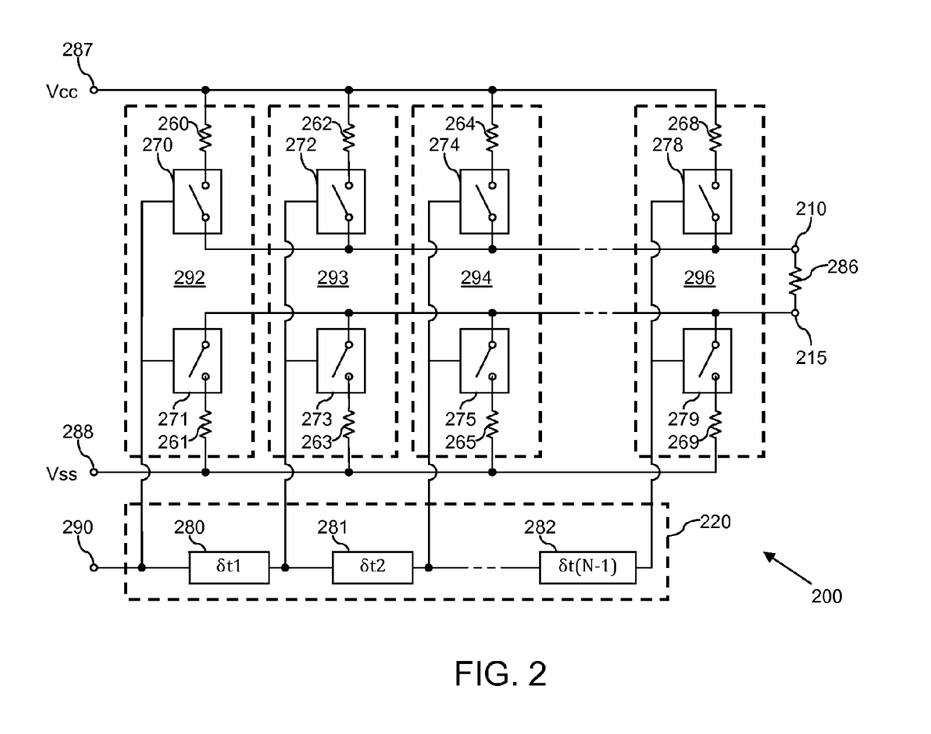
FIG. 2 illustrates a simplified block diagram of an example of a multi-stage line driver circuit.

Referring first to FIG. 2, there is illustrated a simplified block diagram of an example of a multi-stage line driver circuit 200. Accordingly, the line driver circuit 200 comprises a plurality of parallel driver stages 292, 293, 294, 296. The line driver circuit 200 illustrated in FIG. 2 comprises a differential line driver circuit, such as may be implemented for a CAN line driver. As such, each driver stage 292, 293, 294, 296 is operably coupled to differential outputs 210, 215 of the line driver circuit 200. Each driver stage 292, 293, 294, 296 is further arranged to receive a control signal, and to drive an output signal on the differential outputs 210, 215 of the line driver circuit 200 in accordance with the received control signal.

For completeness, in the illustrated example each driver stage 292, 293, 294, 296 comprises a first switching component 270, 272, 274, 278 arranged to selectively couple a first differential output 210 of the line driver circuit 200 to a first supply rail 287, via a first output driver resistance 260, 262, 264, 268, in accordance with a received control signal. Each driver stage 292, 293, 294, 296 further comprises a second switching component 271, 273, 275, 279 arranged to selectively couple a second differential output 215 of the line driver circuit 200 to a second supply rail 288, via a second output driver resistance 261, 263, 265, 269, in accordance with a received control signal. In this manner, each driver stage 292, 293, 294, 296 may be turned on (whereby the switching components 270 to 279 couple the differential outputs 210, 215 to the respective supply rails 287, 288) or turned off (whereby the switching components 270 to 279 decouple the differential outputs 210, 215 to the respective supply rails 287, 288) in accordance with the received control signal.

The line driver circuit 200 further comprises a termination resistor 286 operably coupled between the differential outputs 210, 215.

The line driver circuit 200 further comprises a delay component 220 operably coupled to a control node 290 of the line driver circuit 200, and arranged to receive a control signal from the control node 290. The delay component 220 is further operably coupled to each of the driver stages 292, 293, 294, 296, and arranged to sequentially propagate the control signal received from the control node 290 to the driver stages 292, 293, 294, 296, with a time delay between the propagation of the control signal to adjacent driver stages 292, 293, 294, 296. In this manner, the driver stages 292, 293, 294, 296 may be sequentially turned on or turned off with a time delay between adjacent driver stages 292, 293, 294, 296, enabling a progressive driving of the output signal.

As previously mentioned, in practice it is difficult to completely eliminate reflections on transmission lines, for example such as differential unshielded twisted pair (UTP) transmission lines typically used within a CAN network. Such reflections cause 'ringing', the unwanted oscillation of a signal within the transmission lines, which can impair the performance of receivers as the differential ringing can be interpreted by a receiver as valid signalling. In order to shape the slope of the output signal to minimise the impact of ringing, it is proposed to implement different time delays between adjacent driver stages 292, 293, 294, 296. In this manner, by configuring different time delays between the driver stages being switched on or switched off, the shape of the slope of the output signal for the line driver circuit 200 may be controlled.

Specifically in some examples of the invention, the delay component 220 may be arranged to sequentially propagate the control signal 290 to the driver stages 292, 293, 294, 296 such that the control signal 290 is propagated with a first time delay between the propagation of the control signal 290 to driver stages in a first set of sequentially adjacent driver stages, and the control signal 290 is propagated with at least one further time delay between the propagation of the control signal 290 to driver stages in at least one further set of sequentially adjacent driver stages.

For example, in the illustrated example, the delay component 220 is arranged to propagate the control signal 290 to the driver stages 292, 293, 294, 296 such that the control signal 290 is propagated with a first time delay (δt1) between the propagation of the control signal 290 to driver stages 292, 293 in a first set of sequentially adjacent driver stages. Conversely, the delay component 220 in the illustrated example is arranged to propagate the control signal 290 such that the control signal 290 is propagated with a second time delay (δt2) between the propagation of the control signal 290 to driver stages 293, 294 in a second set of sequentially adjacent driver stages. In this manner, by configuring different time delays between different sets of adjacent driver stages, the shape of the output signal for the line driver circuit 200 may be controlled.

In some examples, it is proposed that the delay component 220 is arranged to propagate the control signal 290 to the driver stages 292, 293, 294, 296 such that the control signal is propagated with a progressively increasing and/or progressively decreasing time delay between sequentially adjacent driver stages. For clarity, such a progressively increasing/decreasing time delay between sequentially adjacent driver stages may comprise a linear or non-linear progressive increase/decrease. For example, and as described in greater detail below, the delay component 220 may be arranged to propagate the control signal 290 to the driver stages 292, 293, 294, 296 such that an output signal of the line driver circuit 200 comprises a substantially linear rising and/or falling slope.

For example, suppose the input voltage (Vcc 287) equals 2.5V, and an output voltage of 1V is required from the driver circuit 200 when, say, ten stages are switched on and the load resistance equals 30 Ohms. The required individual driver stage resistance R for a uniform driver stage architecture may be calculated as: 30/(R/10+30)=1/2.5. Thus R=450 Ohms.

Having calculated the required individual driver stage resistance, the output voltage after switching on each driver stage may be calculated using the equation:

$$V\text{out} = \frac{2.5 * 30}{\frac{450}{x} + 30} \quad \text{[Equation 1]}$$

where x is the number of stages switched on.

For example, the output voltage after switching on the first driver 292 may be calculated as: 2.5*30/(R+30)=0.15625V. Similarly, the output voltage after switching on the second driver stage 293 may be calculated as: 2.5*30/(R/2+30)=0.294118V. As can be seen, the output voltage after switching on the second stage 293 is less than twice the output voltage after switching on the first stage 292, demonstrating a non-linear output voltage progression of such a uniform driver stage architecture. Calculating the derivative for Equation 1 gives:

$$\frac{\partial v}{\partial x} = \frac{75}{2x^2 + 60x + 450} \quad \text{[Equation 2]}$$

The derivative is a measure of how a function changes as its inputs changes, and in this case is an indicator of the linearity of the rise and fall of the output voltage. For a perfectly linear slope of the output voltage, the derivative must comprise a constant value. As can be seen in Equation 2, the number of driver stages (x) that are switched on affects the derivative value, clearly demonstrating that the derivative value is not constant and thus that the output voltage slope for a uniform driver stage architecture is non-linear.

Figure 3:
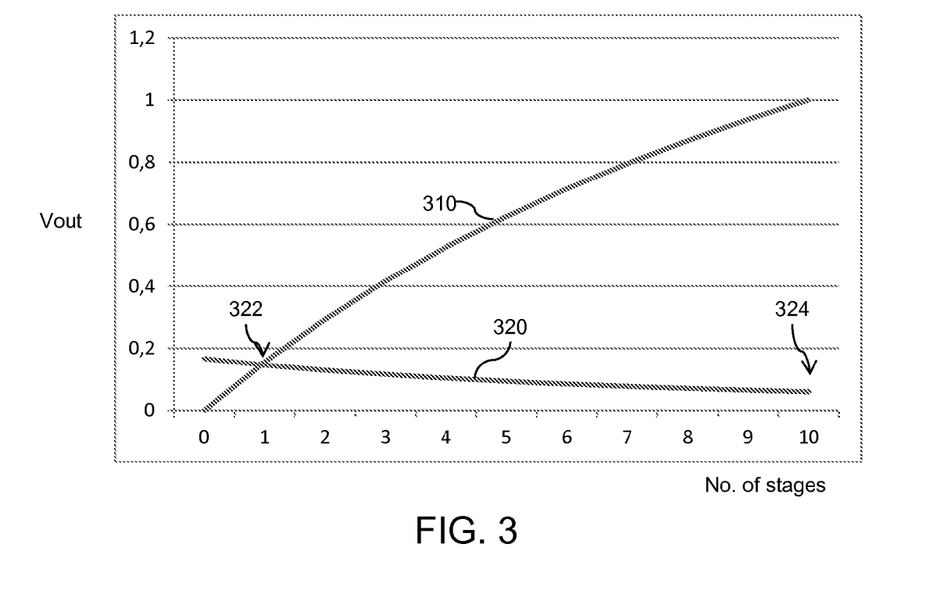
FIGS. 3 and 4 illustrate examples of plots for the output voltage of the line driver circuit of FIG. 2.

FIG. 3 illustrates an example of a plot for the output voltage 310 of the line driver circuit 200 of FIG. 2 and a plot for the derivative 320 therefore versus the number of driver stages 292, 293, 294, 296 switched on. As can be seen, the derivative 320 is approximately three times higher for switching the first stage, as indicated at 322, than it is for switching the tenth stage, as indicated at 324.

Figure 4:
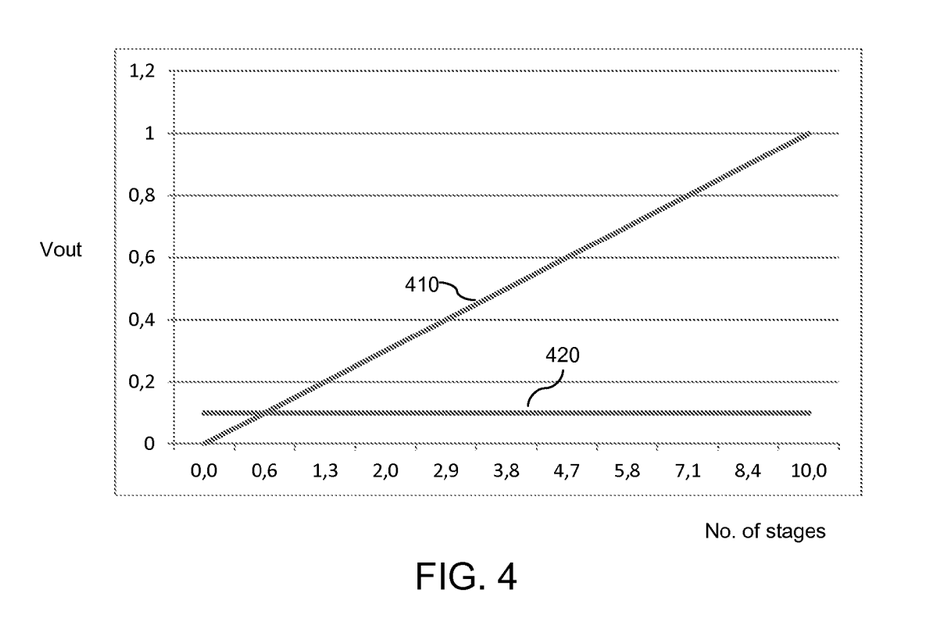

The inventors have identified that the discrete points within the x axis in FIG. 3, which represent the number of driver stages switched on, may be represented by discrete points in time during the driving high or low of the output voltage, whereby in the above analysis involving Equations 1 and 2, and in the prior art driver circuits, driver stages are sequentially switched on/off at uniform intervals. The inventors have further identified that the output voltage slope may be made linear by 'warping' time. For example, FIG. 4 illustrates an example of a plot for the output voltage 410 and its derivative 420 versus time, with the number of driver stages switched on being 'normalised' with reference to time in order to achieve a linear output voltage slope, and thus a constant derivative therefor.

In the above example, if x in Equation 1 is replaced with a time delay function of: $x/(1+(10-x)/15)$, a new output voltage equation may be derived:

$$V\text{out} = \frac{2.5*30}{\frac{450}{x}\left(1+\frac{10-x}{15}\right)+30} = \frac{x}{10} \quad \text{[Equation 3]}$$

that has a constant derivative of:

$$\frac{\partial v}{\partial x} = \frac{1}{10} \quad \text{[Equation 4]}$$

By configuring the delay component 220 to propagate the control signal 290 to the driver stages 292, 293, 294, 296 such that the control signal 290 is propagated with delays between sequentially adjacent driver stages 292, 293, 294, 296 configured in accordance with such a time delay function derived to achieve a constant derivative of the output voltage signal for the switching driver stages 292, 293, 294, 296, a linear output voltage slope may be achieved with uniform driver stages 292, 293, 294, 296. For example, in the illustrated example, the delay component 220 comprises delay blocks 280, 281, 282, which provide the time delays between the propagation of the control signal 290 to sequentially adjacent driver stages 292, 293, 294, 296. Applying such a time delay function to the delay blocks 280, 281, 282 may result in a first delay block 280 located between the first driver stage 292 and the second driver stage 293 comprising a delay of $k*(1+(10-1)/15)=k/(1+9/15)$; a second delay block 281 located between the second driver stage 293 and the third driver stage 294 comprising a delay of $k*(1+(10-2)/15)=k/(1+8/15)$; etc., where k comprises a fixed parameter that determines the slope rise and fall times, but does not affect the linearity of the slope.

The described example hereinabove relates to an example driver circuit for a 30 Ohm load, 1V output and 10 driver stages. Accordingly, the various values may be adjusted within the equations to accommodate different circuit arrangements.

Figure 5:
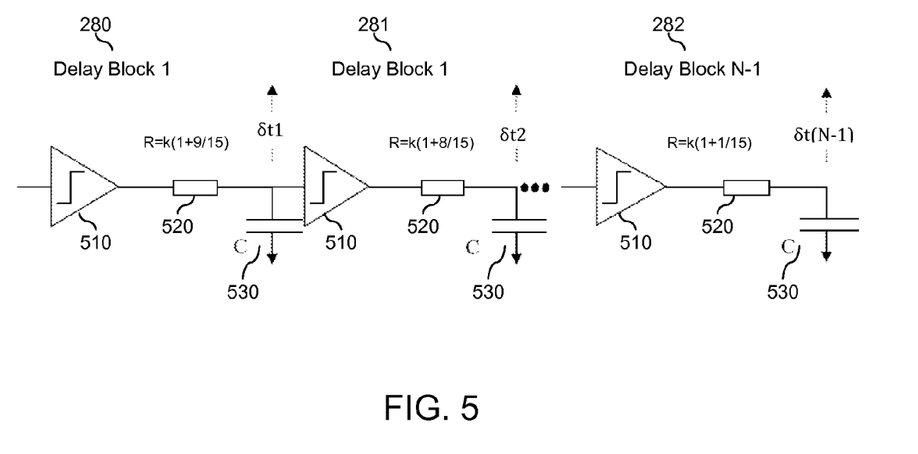
FIG. 5 illustrates a simplified block diagram of an example of delay blocks.

The delay blocks 280, 281, 282 may be easily implemented using inverters, comparators, driving RC (resistance/capacitance) time constant circuits, etc. For example, FIG. 5 illustrates a simplified block diagram of an example of delay blocks 280, 281, 282, such as may be implemented within the delay component 220. In the example illustrated in FIG. 5, each delay block 280, 281, 282 comprises a comparator component 510 and an RC circuit operably coupled in series with the comparator component 510, which in the illustrated example comprises a resistance 520 and a capacitance 530. The time delays for the delay blocks 280, 281, 282 may be configured by configuring the resistive and capacitive values within the respective RC circuits. For example, the delay blocks 280, 281, 282 may be configured in accordance with a time delay function derived to achieve a constant derivative of the output voltage signal, such as the time delay function described above, by appropriate configuring the resistance values in the respective RC circuits. For example, and as illustrated in FIG. 5, the resistance 520 in the RC circuit of the first delay block 280 may be configured to comprise a resistive value of $R=k/(1+9/15)$, the resistance 520 in the RC circuit of the second delay block 281 may be configured to comprise a resistive value of $R=k/(1+8/15)$, etc. The time delays may be scaled through adjusting the constant value k of the resistances 520 and the constant value C of the capacitances 530. Thus, a time delay function of $C*k*(1+(10-N)/15)$ may be implemented within the delay blocks in order to a required linear output slope, where N is the respective delay block position within the sequence of delay blocks.

The example implementation described above enables the delay blocks 280, 281, 282 to be configured in accordance with a time delay function derived to achieve a constant derivative of the output voltage signal in relation to a rising slope. In order to achieve a corresponding constant derivative of the output voltage signal in relation to a falling slope, the time delays applied by each of the delay blocks 280, 281, 282 need to be reversed.

Figure 6:
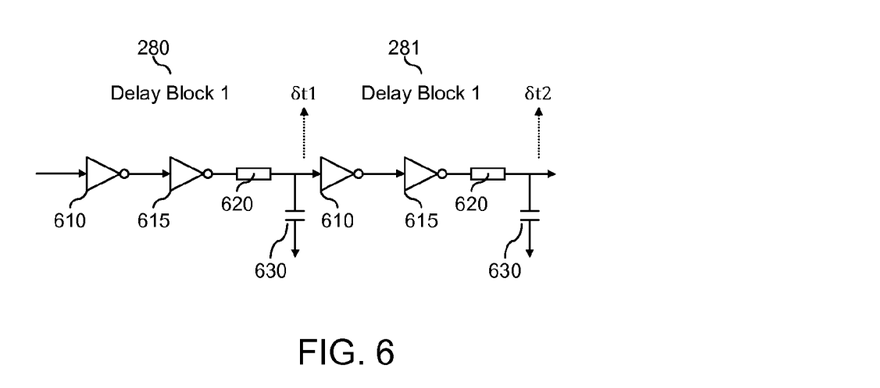
FIGS. 6 to 8 illustrate an example of a delay block implementation in which differing delays may be implemented for rising and falling slopes of the output signal.
Figure 7:
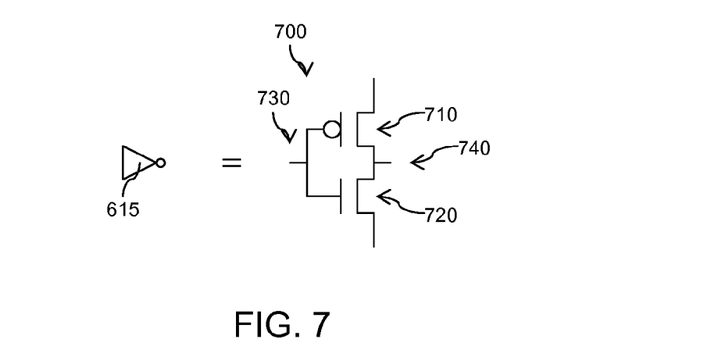
Figure 8:
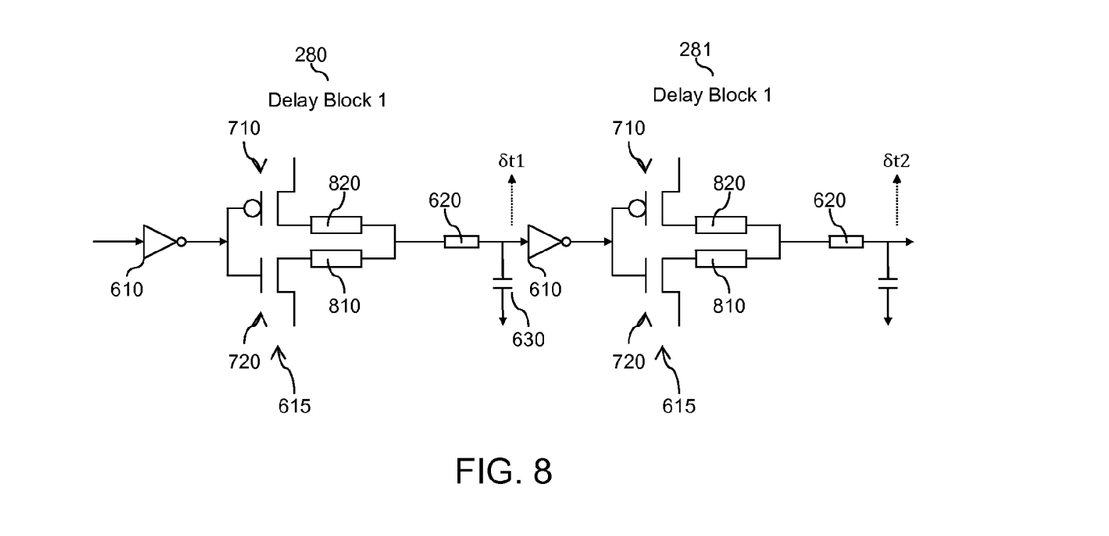

FIGS. 6 to 8 illustrate an example of a delay block implementation in which differing delays may be implemented for rising and falling slopes of the output signal, and in particular in the illustrated example in which the same delays implemented for linear rising slopes of the output signal may be implemented in reverse for linear falling slopes of the output signal.

Referring first to FIG. 6, there is illustrated a simplified block diagram of an alternative example of delay blocks 280, 281 within the delay component 200. In the example illustrated in FIG. 6, each delay block 280, 281 comprises a pair of series inverters 610, 615 and an RC circuit operably coupled in series with the comparator component 510, which in the illustrated example comprises a resistance 520 and a capacitance 530. As for the example delay block arrangement illustrated in FIG. 5, the time delays for the delay blocks 280, 281 may be configured by configuring the resistive and capacitive values within the respective RC circuits.

Referring now to FIG. 7, there is illustrated a simplified circuit diagram 700 of an example of an inverter circuit 700, such as may be implemented within the inverters 610, 615 within the delay blocks of FIG. 6. In the example illustrated in FIG. 7, the inverter circuit 700 comprises a pair of complimentary transistors. Specifically, the inverter comprises a p-channel metal oxide semiconductor (PMOS) transistor 710 and an n-channel metal oxide semiconductor (NMOS) transistor 720 with common gate and source terminals. As is well known, when an input 730 of the inverter circuit 700 receives a 'low' voltage signal, the NMOS transistor 720 is switched off and the PMOS transistor 710 is switched on, coupling an output 740 of the inverter circuit 700 to, for example, a high voltage supply rail (not shown). In contrast, when the input 730 of the inverter circuit 700 receives a 'high' voltage signal, the PMOS transistor 710 is switched off and the NMOS transistor 720 is switched on, coupling the output 740 of the inverter circuit 700 to, for example, a low voltage supply rail (not shown).

Referring now to FIG. 8, there is illustrated a simplified circuit diagram of the delay block implementation of FIG. 6, in which one of the inverters 615 in each of the delay blocks 280, 281 has been arranged to enable differing delays to be implemented for rising and falling slopes. In particular, in the example illustrated in FIG. 8, resistances 810, 820 have been introduced into the second inverter 615 in each of the delay blocks 280, 281 (which is illustrated by way of a simplified circuit diagram), between the output 740 thereof and each of the transistors 710, 720. In this manner, when an input of the second inverter 615 receives a 'low' voltage signal, for example when the line driver circuit 200 is required to drive the output thereof high, the output of the second inverter 615 will be operably coupled to, for example, a high voltage supply rail (not shown) via a first inverter resistance 810. Accordingly, when the input of the second inverter 615 receives a low voltage signal the first inverter resistance 810 will form part of the RC delay circuit, along with the resistance 620 and capacitance 630. Conversely, when the input of the second inverter 615 receives a 'high' voltage signal, for example when the line driver circuit 200 is required to drive the output thereof low, the output of the second inverter 615 will be operably coupled to, for example, a low voltage supply rail (not shown) via a second inverter resistance 820. Accordingly, when the input of the second inverter 615 receives a high voltage signal the second inverter resistance 820 will form part of the RC delay circuit along with the resistance 620 and capacitance 630.

Thus, by configuring the first and second resistances 810, 820 within the respective signal paths of the second inverter 615, a different time delay may be configured within the respective delay block 280, 281 when the control signal 290 comprises a high state and when the control signal 290 comprises a low state. In this manner, a first set of delays may be configured between sequentially adjacent driver stages 292, 293, 294, 296 during a rising slope of the output signal of the line driver circuit 200, whilst a second set of delays may be configured between sequentially adjacent driver stages 292, 293, 294, 296 during a falling slope of the output signal of the line driver circuit 200. For example, in order to implement a time delay function of C*k*(1+(10−N)/15) for both a rising output slope and a falling output slope, the common resistance 620 may be configured to comprise a value of k, whilst the first inverter resistance 810 within each of the second inverters 615 may be configured to comprise values according to: R=k((10−N)/15), and the second inverter resistance 820 with each of the second inverters 615 may be configured to comprise values according to: R=k((N−1)/15). In this manner, the sequence of time delays through the delay component for a rising edge of the output of the line driver circuit 200 may be reversed for a falling edge.

Figure 9:
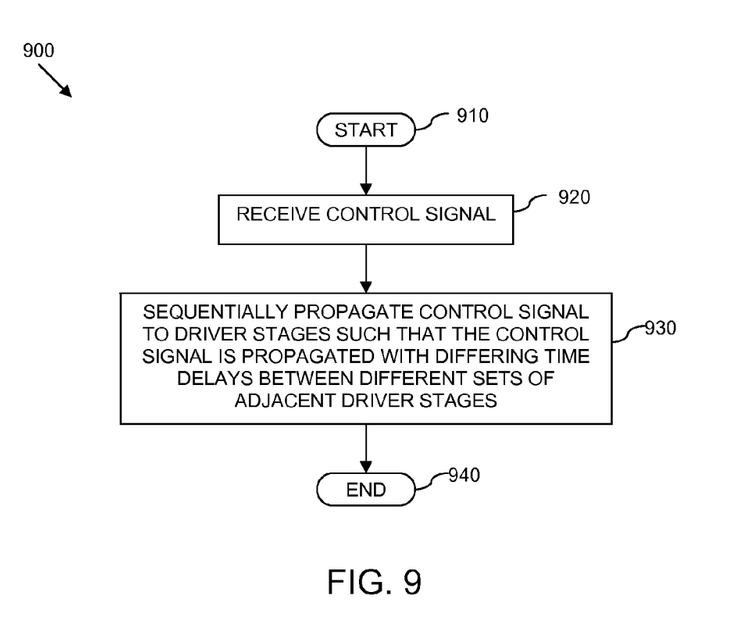
FIG. 9 illustrates an example flowchart of driving an output signal for transmission over at least one communication line.

Referring now to FIG. 9, there is illustrated a simplified flowchart 900 of an example of a method of driving an output signal for transmission over at least one communication line, for example such as may be implemented within the line driver circuit 200 of FIG. 2. The method starts at 910, and moves on to step 920 where a control signal is received. Next, at 930, the control signal is propagated to driver stages such that the control signal is propagated with differing time delays between at least two sets of different adjacent driver stages. For example, the control signal may be propagated such that the control signal is propagated with a progressively increasing time delay between sequentially adjacent driver stages, and/or a progressively decreasing time delay between sequentially adjacent driver stages. In some examples, the control signal may be propagated such that an output signal of the line driver circuit comprises a substantially linear slope. In some examples, the control signal may be propagated such that the control signal is propagated with delays between sequentially adjacent driver stages configured in accordance with a time delay function derived to achieve a constant derivative of the output voltage signal for the switching driver stages. In some examples, the control signal may be propagated such that the control signal is propagated with a first set of delays between sequentially adjacent driver stages during a rising slope of the output signal of the line driver circuit, and with a different set of delays between sequentially adjacent driver stages during a falling slope of the output signal of the line driver circuit. The method ends at 940.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A differential line driver circuit comprising:
 a plurality of driver stages, each driver stage being operably coupled to two different outputs of the line driver circuit and arranged to receive at least one control signal and to drive output signals on the two different outputs of the line driver circuit in accordance with the at least one control signal received thereby;
 the line driver circuit further comprises at least one delay component arranged to receive the at least one control signal, and to sequentially propagate the at least one control signal to the driver stages with time delays between the propagation of the at least one control signal to sequentially adjacent driver stages;
 wherein
 each of the plurality of driver stages includes a first switch, a first resistor, a second switch, and a second resistor,
 the first switch of one of the plurality of driver stages is operated with the at least one control signal to couple the first resistor of the one of the plurality of driver stages to one of the different outputs, and
 the second switch of the one of the plurality of driver stages is operated with the at least one control signal to couple the second resistor of the one of the plurality of driver stages to another one of the different outputs; and
 the delay component is arranged to sequentially propagate the at least one control signal to the driver stages such that the at least one control signal is propagated with at least one of:
  a progressively increasing time delay between sequentially adjacent driver stages; and
  a progressively decreasing time delay between sequentially adjacent driver stages.

2. The differential line driver circuit of claim 1, wherein the at least one delay component is arranged to propagate the at least one control signal to the driver stages such that an output signal of the line driver circuit comprises a substantially linear slope.

3. The differential line driver circuit of claim 2, wherein the at least one delay component is arranged to propagate the at least one control signal to the driver stages such that the at least one control signal is propagated with delays between sequentially adjacent driver stages configured in accordance with a time delay function derived to achieve a constant derivative of an output voltage signal for the switching driver stages.

4. The differential line driver circuit of claim 1, wherein the at least one delay component is arranged to propagate the at least one control signal to the driver stages such that:
 the at least one control signal is propagated with a first set of delays; and
 the at least one control signal is propagated with a different set of delays between sequentially adjacent driver stages during a falling slope of at least one of the output signals of the line driver circuit.

5. The differential line driver circuit of claim 4, wherein the set of delays between sequentially adjacent driver stages during a falling slope of the at least one output signal of the line driver circuit is the reverse of the set of delays between sequentially adjacent driver stages during a rising slope of the at least one of the output signals of the line driver circuit.

6. The differential line driver circuit of claim 4, wherein different time delays are configured within a respective delay block between adjacent driver stages for a rising slope and a falling slope by configuring different resistances within respective signal paths of an inverter of the delay block.

7. The differential line driver circuit of claim 1, wherein the line driver circuit comprises a plurality of uniform driver stages.

8. The differential line driver circuit of claim 1, wherein the line driver circuit comprises a Controller Area Network (CAN) line driver circuit.

9. The differential line driver circuit of claim 1 when implemented within an integrated circuit device comprising at least one die within a single integrated circuit package.

10. The differential line driver circuit of claim 1, wherein the delay component includes a plurality of delay blocks, and each of the plurality of delay blocks includes a comparator component and an RC circuit operably coupled in series with the comparator component.

11. The differential line driver circuit of claim 1, further comprising a termination resistor coupled between the different outputs.

12. The differential line driver circuit of claim 1, wherein the delay component includes a plurality of delay blocks, and each of the plurality of delay blocks includes a pair of series inverters and an RC circuit operably coupled in series with the pair of series inverters.

13. The differential line driver circuit of claim 1, wherein the delay component includes a plurality of delay blocks, and each of the plurality of delay blocks includes a pair of complimentary transistors.

14. A method of driving output signals for transmission over differential outputs, the method comprising:
 receiving at least one control signal; and
 sequentially propagating the at least one control signal to a plurality of driver stages with time delays between the propagation of the at least one control signal to sequentially adjacent driver stages, wherein each of the plurality of driver stages includes a first switch, a first resistor, a second switch, and a second resistor,
 wherein the method further comprises:
 operating the first switch of one of the plurality of driver stages with the at least one control signal to couple the first resistor of the one of the plurality of driver stages to one of the differential outputs;

operating the second switch of the one of the plurality of driver stages with the at least one control signal to couple the second resistor of the one of the plurality of driver stages to another one of the differential outputs;
sequentially propagating the at least one control signal to the driver stages such that:
the at least one control signal is propagated with at least one of:
  a progressively increasing time delay between sequentially adjacent driver stages; and
  a progressively decreasing time delay between sequentially adjacent driver stages.

* * * * *